US005150805A

United States Patent [19]

Vinals

[11] Patent Number: 5,150,805

[45] Date of Patent: Sep. 29, 1992

[54] FLUID SEAL APPARATUS

[75] Inventor: Manuel Vinals, San Quirze del Valles, Spain

[73] Assignee: Schlumberger Industries, Montornes Del Valles, Spain

[21] Appl. No.: 762,146

[22] Filed: Sep. 19, 1991

[30] Foreign Application Priority Data

Sep. 28, 1990 [FR] France ............ 90 11953

[51] Int. Cl.[5] ............ B65D 88/48

[52] U.S. Cl. ............ 220/217; 220/216; 220/221

[58] Field of Search ............ 220/217, 216, 221

[56] References Cited

U.S. PATENT DOCUMENTS 2,134,167 10/1938 Wise ............ 220/217 X
2,927,829 3/1960 Porter .
3,125,879 3/1964 Porter .
4,307,601 12/1981 Jackson .

FOREIGN PATENT DOCUMENTS 2275709 1/1976 France .
614331 7/1978 U.S.S.R. .

*Primary Examiner*—Stephen Marcus
*Assistant Examiner*—Paul A. Schwarz
*Attorney, Agent, or Firm*—Dale V. Gaudier

[57] ABSTRACT

The apparatus of the invention is applicable to gasholders and comprises a mercury seal, e.g. for a gas holder, which seal provides fluid-tight sealing in an annular space formed between a cylinder and a piston. The mercury is deposited in a reservoir which is inside the piston but which communicates with the annular space outside the piston. In the reservoir, the mercury is subjected to the inside pressure P of the cylinder, and it moves up inside the annular space when the difference between the inside and outside pressure P and Po increases, thereby forming an adaptive fluid seal.

4 Claims, 2 Drawing Sheets

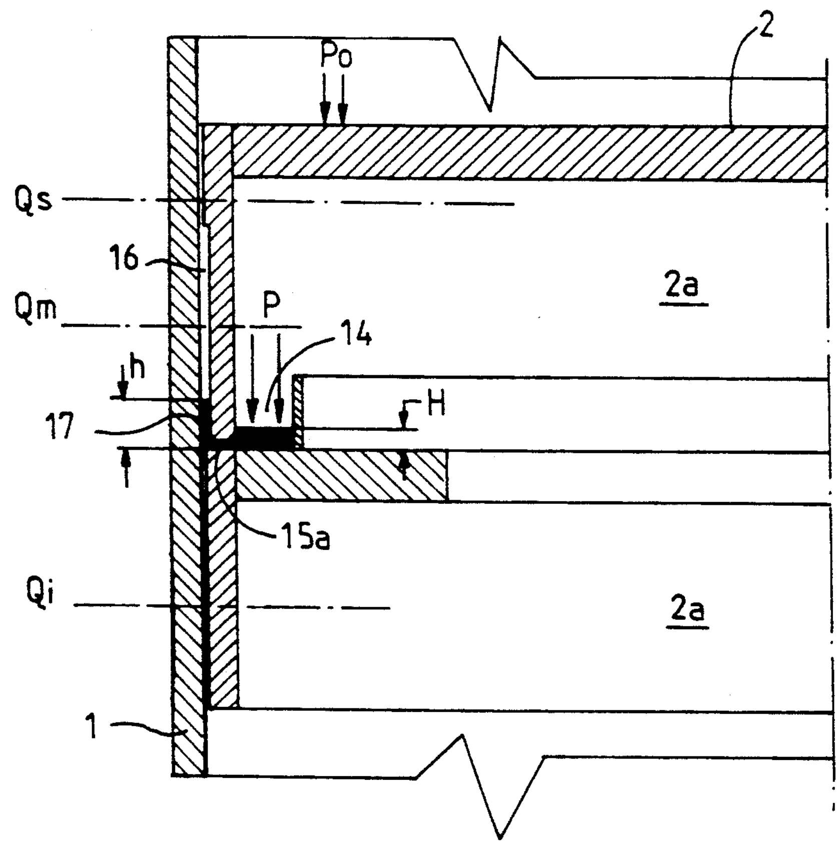
FIG. 2
FIG. 3
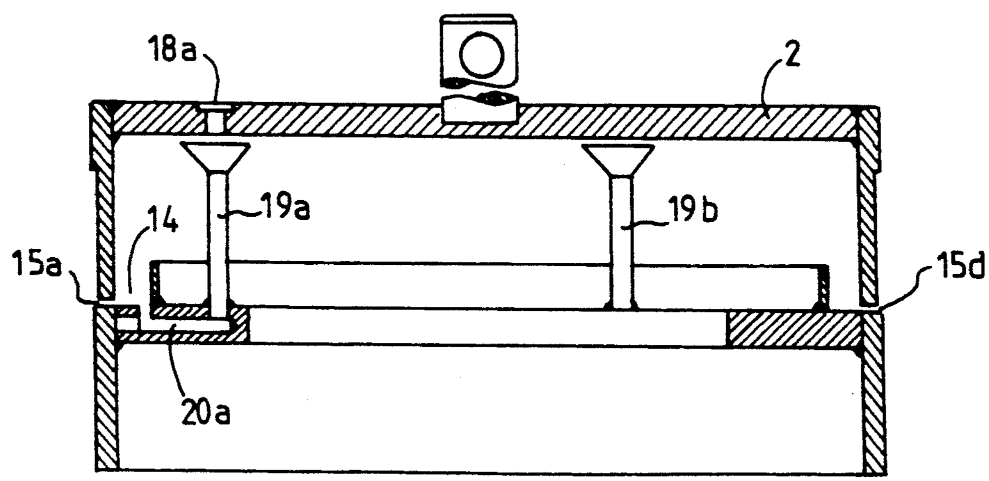

FLUID SEAL APPARATUS

FLUID SEAL SEALING APPARATUS

The present invention relates to apparatus for separating a first volume of fluid from a second volume of fluid, said apparatus comprising a substantially vertical cylinder, a piston and a seal, the piston being slidably mounted inside the cylinder and co-operating with a bottom portion of the cylinder to delimit the first volume of fluid, the seal comprising a liquid filling an annular space formed between the piston and the cylinder, to provide fluid-tight sealing at this space.

BACKGROUND OF THE INVENTION

An example of apparatus of this type is described in Canadian Patent CA 1 123 792 which relates more precisely to a mercury seal intended to be fitted on a cylindrical opening of an enclosure so as to close off the enclosure hermetically and, in particular, so as to prevent the gases respectively inside and outside the enclosure from mixing together.

In that prior art apparatus, the annular mercury seal is confined between two elastomer O-rings which keep the mercury seal in place.

Although quite appropriate when the piston is permanently fixed in the cylinder, this solution suffers from reliability problems when the piston is to slide in the cylinder, since wear and stress on the O-ring seals may cause leakage of the sealing liquid (mercury in this case).

In this context, an aim of the present invention is to provide a sealing apparatus which is more reliable than the apparatus of the above-mentioned patent, and which, in particular, may be used quite safely when the pressure difference between the first and second volumes changes and/or is relatively large.

SUMMARY OF THE INVENTION

To this end, the piston in the apparatus of the invention has a cavity opening out into the first volume of fluid, and the piston further includes at least one reservoir which is subjected to the pressure of the first volume of fluid, which is housed in said cavity, which contains the sealing liquid, and which communicates freely with said annular space via through orifices in the piston, the liquid thereby taking up respective levels firstly in the reservoir and secondly in the annular space, with the difference between these respective levels being a function of the difference between the respective pressures in the first and second volumes of fluid.

The property of this disposition whereby the height of the mercury seal automatically adapts to the difference between the respective pressures of the first and second volumes of fluid, thereby, in particular, avoiding the drawback from which a fixed-height seal would suffer, namely the drawback of running out under gravity if the pressure of the bottom volume is too low, and of not being able to withstand the pressure of the bottom volume if it is too high.

In a preferred embodiment, the annular space is specially provided in the outside periphery of the piston by shaping a middle portion of the height of the piston, with said through orifices in the piston opening out at the base of this middle portion.

Given the high density of mercury, the sealing liquid used is preferably a metal, but, in any event, it must be a liquid which is denser that the two fluids to be separated.

In order to provide better distribution of the sealing liquid, the reservoir containing the sealing liquid is preferably annular and in communication with the annular space via at least two orifices.

Given its sealing capabilities, the apparatus of the invention ideally applies to making a gas holder.

BRIEF DESCRIPTION OF THE DRAWINGS

An embodiment of the invention is described by way of example with reference to the accompanying drawings, in which:

FIG. 2 is a diagrammatic fragmentary view in section through the piston of the FIG. 1 gas holder, showing the basic principle of the invention; and FIG. 3 is a section through the piston of the FIG. 1 gas holder, showing details of an industrial embodiment of this piston.

DETAILED DESCRIPTION

Figure 1:
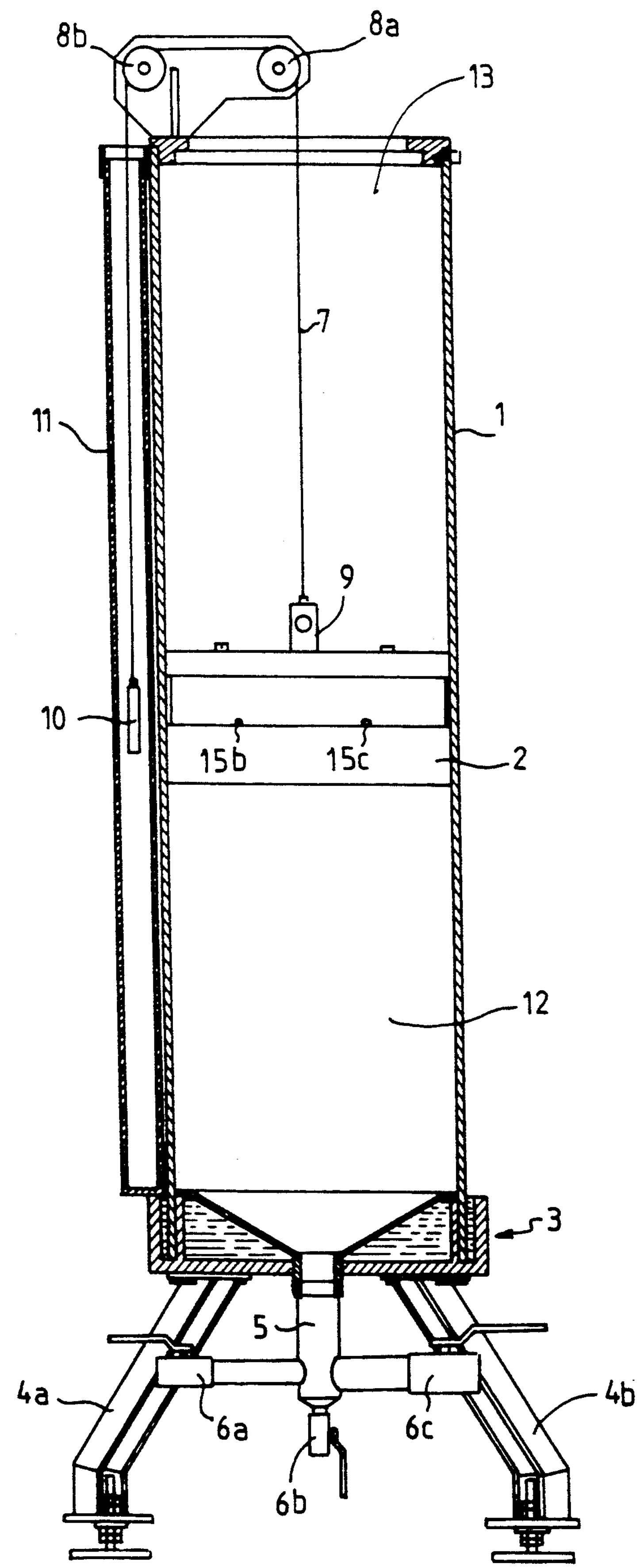
FIG. 1 is a section through a gas holder made in accordance with the invention.

FIG. 1 is a general view showing a gas-tight chamber, referred to as a "gas holder", having an inside volume which is variable and delimited by a vertical cylinder 1 and by a piston 2 slidably mounted therein.

The bottom of the cylinder is hermetically closed by a base 3 standing on the ground by means of adjustable-height legs *4a*, *4b*, *4c*, with the last leg *4c* not being shown in the figure.

A duct 5 passes through base 3 and is selectively opened or closed by one or more valves, such as *6a*, *6b*, and *6c*, for filling the has holder, for drawing off stored gas e.g. for feeding to gas meters to be calibrated at constant pressure, and for emptying the gas holder.

The top of the cylinder 1 is open to allow a cable 7 to pass therethrough, which cable runs over two pulleys *8a*, *8b* to link a top anchoring point on the piston 2 to a counterweight 10 slidably mounted in a vertical guide 11.

Since the counterweight 10 is lighter in weight than the piston 2, the gas stored inside the bottom volume 12 of the gas holder is subjected to a pressure greater than the pressure of the outside gas in the volume 13, with the difference between the two pressures corresponding to the difference in weight between the piston and the counterweight, distributed over the entire cross-sectional area of the cylinder 1.

Although particularly suited to making the gas holder in FIG. 1, the present invention is more specifically shown in FIG. 2 which shows the cylinder 1 and the piston 2 again, but this time in fragmentary manner.

As shown in FIG. 2, the piston 2 is hollow and its cavity *2a*, which opens out into the volume 12 of stored gas and which contains a portion of said stored gas, is subjected to the pressure of this volume of gas.

This piston includes an annular reservoir 14 which is also subjected to the pressure P of the volume of gas 12, which is housed inside the cavity *2a*, and which contains a liquid 17 (usually mercury) suitable for acting as a seal.

By means of through orifices in the piston, such as *15a*, *15b*, *15c*, and *15d*, the reservoir 14 communicates freely with an annular space 16 formed between the piston 1 and the cylinder 2.

Preferably, the annular space 16 is specially provided in the outside periphery of the piston by shaping a middle portion of the height of the piston so that the diameter of the piston in a plane Qm of this middle portion, is less than the diameter of the piston in respective top and bottom planes Qs and Qi, with the difference being about 0.04 centimeters for example.

For example, there may be 6 orifices such as 15*a*, 15*b*, and 15*c*, and these orifices are distributed at regular intervals around the circumference of the piston and they open out at the base of the middle portion which defines the annular space.

Using this disposition, the liquid 17 takes up levels H and h respectively in the reservoir 14 and in the annular space 16. The difference between these respective levels H and h is a function of the difference P−Po between the pressures P and Po in the first and second volumes of gas 12 and 13 respectively.

With a difference of 0.04 centimeters between the diameters Qm and Qi, the maximum valve of h for mercury is about 1.63 centimeters.

In an industrial embodiment of apparatus of the invention, it may be appropriate, as shown in FIG. 3, to provide filling orifices such as 18*a* in the top face of the piston 2, which filling orifices are hermetically closed off after the reservoir 14 has been filled, and are in communication with the reservoir via one or more funnels such as 19*a*, 19*b*, and via ducts such as 20*a*.

I claim:

1. Apparatus for separating a first volume of fluid from a second volume of fluid, said apparatus comprising a substantially vertical cylinder, a piston and a seal, the piston being slidably mounted inside the cylinder and cooperating with a bottom portion of the cylinder to delimit the first volume fluid, the seal comprising a liquid filling an annular space formed between the piston and the cylinder, to provide fluid-tight sealing at this space, wherein the piston has a cavity opening out into the first volume of fluid, and wherein the piston includes at least one reservoir which is subjected to the pressure of the first volume of fluid, which is housed in said cavity, which contains the sealing liquid, and which communicates freely with said annular space via through orifices in the piston, the liquid thereby taking up respective levels firstly in the reservoir and secondly in the annular space, with the difference between these respective levels being a function of the difference between the respective pressures in the first and second volumes of fluid.

2. Apparatus according to claim 1, wherein said annular space is specially provided in the outside periphery of the piston by shaping a middle portion of the height of the piston, and in that said orifices open out at the base of this middle portion.

3. Apparatus according to claim 1, wherein said sealing liquid is mercury.

4. Apparatus according to claim 1, wherein said reservoir is annular and communicates with said annular space via at least two orifices.

* * * * *